(12) United States Patent
Takehara (10) Patent No.: US 7,119,717 B2
(45) Date of Patent: Oct. 10, 2006

(54) ENCODER OUTPUT DIVIDER AND R/D CONVERTER

(75) Inventor: Takao Takehara, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/812,311

(22) Filed: Mar. 30, 2004

(65) Prior Publication Data

US 2004/0233080 A1    Nov. 25, 2004

(30) Foreign Application Priority Data

Apr. 1, 2003   (JP) .............................. 2003-098318

(51) Int. Cl.
*H03M 1/22* (2006.01)
(52) U.S. Cl. ........................................ 341/11; 341/116
(58) Field of Classification Search .................. 341/11, 341/116, 114, 111; 318/632
See application file for complete search history.

(56) References Cited

U.S. PATENT DOCUMENTS

| | | | | |
|---|---|---|---|---|
| 3,651,317 A | * | 3/1972 | Falk ........................... | 708/273 |
| 4,079,374 A | * | 3/1978 | Cox, Jr. ...................... | 341/116 |
| 4,424,482 A | * | 1/1984 | Drogin ....................... | 324/76.47 |
| 4,782,329 A | | 11/1988 | Iijima et al. | |
| 4,862,433 A | * | 8/1989 | Bezos et al. ................ | 368/108 |
| 5,051,692 A | * | 9/1991 | Okutani ...................... | 324/175 |
| 5,188,348 A | * | 2/1993 | Fuseki ......................... | 270/45 |
| 5,235,262 A | * | 8/1993 | Takeuchi et al. ............ | 318/603 |
| 5,332,955 A | * | 7/1994 | Hopper ........................ | 318/632 |
| 5,608,394 A | * | 3/1997 | Hirabayashi ................. | 341/11 |
| 6,491,780 B1 | * | 12/2002 | Gallagher .................... | 156/234 |
| 6,759,973 B1 | * | 7/2004 | Villaret et al. ................ | 341/11 |
| 6,856,586 B1 | * | 2/2005 | Usui et al. .................... | 369/47.28 |
| 2003/0172727 A1 | * | 9/2003 | Herb ............................ | 73/116 |

FOREIGN PATENT DOCUMENTS

| | | |
|---|---|---|
| EP | 0 244 385 | 11/1987 |
| JP | A-62-38302 | 2/1987 |
| JP | A-62-257065 | 11/1987 |
| JP | A-1-182721 | 7/1989 |
| JP | U-7-21660 | 4/1995 |
| JP | A-7-218289 | 8/1995 |
| JP | A-2000-275039 | 10/2000 |

* cited by examiner

*Primary Examiner*—Peguy JeanPierre
(74) *Attorney, Agent, or Firm*—Adduci, Mastriani & Schaumberg, L.L.P.

(57) ABSTRACT

A Resolver/Digital (R/D) converter includes an encoder output divider having a DSP generating 14-bit encoded signals A2 and B2 from a timing analysis performed during the first period of 12-bit encoded signal A1. The DSP generates a selection signal output to a multiplexer to select encoded signals A1 and BE1 or encoded signals A2 and B2 depending on the rotational speed of the rotor of a resolver. Based on the selection signal, the multiplexer outputs 12-bit encoded signals A1 and B1 when the rotational speed is less than 400 rpm or greater than 1200 rpm, and outputs 14-bit encoded signals A2 and B2 when rotational speed is between 400 rpm and 1200 rpm.

9 Claims, 5 Drawing Sheets

ENCODER OUTPUT DIVIDER AND R/D CONVERTER

CROSS REFERENCE TO RELATED APPLICATION

This application is based on and incorporates by reference Japanese Patent Application No. 2003-098318 filed on Apr. 1, 2003.

BACKGROUND OF THE INVENTION

The present invention relates to digital converters, or Resolver/Digital (R/D) converters, for digitizing the output of resolvers, and more particularly to an encoder output divider configured to divide an encoding output associated with an R/D converter.

A resolver is a type of rotary transformer typically having two stator windings and one rotor winding on an axis or shaft. A resolver is used for determining the position of the shaft, or more specifically the axis of the rotor with respect to a reference point within a space of one complete revolution of the shaft. One of ordinary skill will appreciate that any shaft position has a corresponding angular displacement within an angle space from 0° to 360°. The two stator windings are mechanically arranged such that their physical relation is shifted by a 90° angle. The physical spacing of the stator windings gives rise to a mathematical/electrical relation in that any signals induced in the stator windings from, for example, a rotor excitation signal, will be correspondingly shifted by 90°. Thus the sine and cosine function relations are conveniently assigned to the respective outputs of the stator windings to provide an electrical expression of the mechanical relation. It will be appreciated that the degree of accuracy of the 90° physical relation based on, for example, accurate placement of stator windings, will affect the degree to which the outputs are electrically shifted by 90° and thus accurately represent a sine and a cosine relation respectively. It is understood by those of ordinary skill in the art that the sine and cosine functions are mathematically characterized by a 90° shift therebetween.

The amplification of a signal obtained by coupling with the stator windings is a function of the position of the resolver rotor axis and the relative positions of the stator windings. Therefore, two types of output voltages, S3-S1, S4-S2, as may be measured between corresponding terminals of the two stator windings, are modulated according to a sine wave function and a cosine wave function corresponding to the axis angle of the resolver rotor relative to the stator windings. The output voltage waveforms can be expressed in the following formulae (1) and (2).

$$S3-S1 = A(\sin \omega t)(\sin \theta) \quad (1)$$

$$S4-S2 = A(\sin \omega t)(\cos \theta) \quad (2)$$

where "$\theta$" is the angle of the rotor axis, "$\omega$" is the angular velocity corresponding to the rotor excitation frequency (f), and "A" is the rotor excitation amplification.

Proposals have been set forth for Resolver/Digital (R/D) converters in which, of the continuous output voltage signals S3-S1 and S4-S2, the signal with the smaller absolute value or magnitude is divided by the signal with the larger absolute value. Based on a resulting continuous signal associated with the quotient, the angle data is obtained. An example of such a proposed R/D converter may be seen, for example, in Japanese Unexamined Patent Application Publication S62-38302. Therein, $\tan \theta$ and $\cot \theta$ are calculated from output voltages S3-S4, S4-S2. At the same time, a digital code for $A(\sin \omega t)$ is determined from the output voltage S3-S1, the digital code result such as an index, and the angle section of resolver rotor axis obtained from the digital code result or index. As noted, one of either $\tan \theta$ or $\cot \theta$ may be used as a digital code, and angle data associated with resolver rotor axis angle $\theta$ and corresponding to the digital code or index and stored in advance in a table, read from the table and output.

Figure 3:
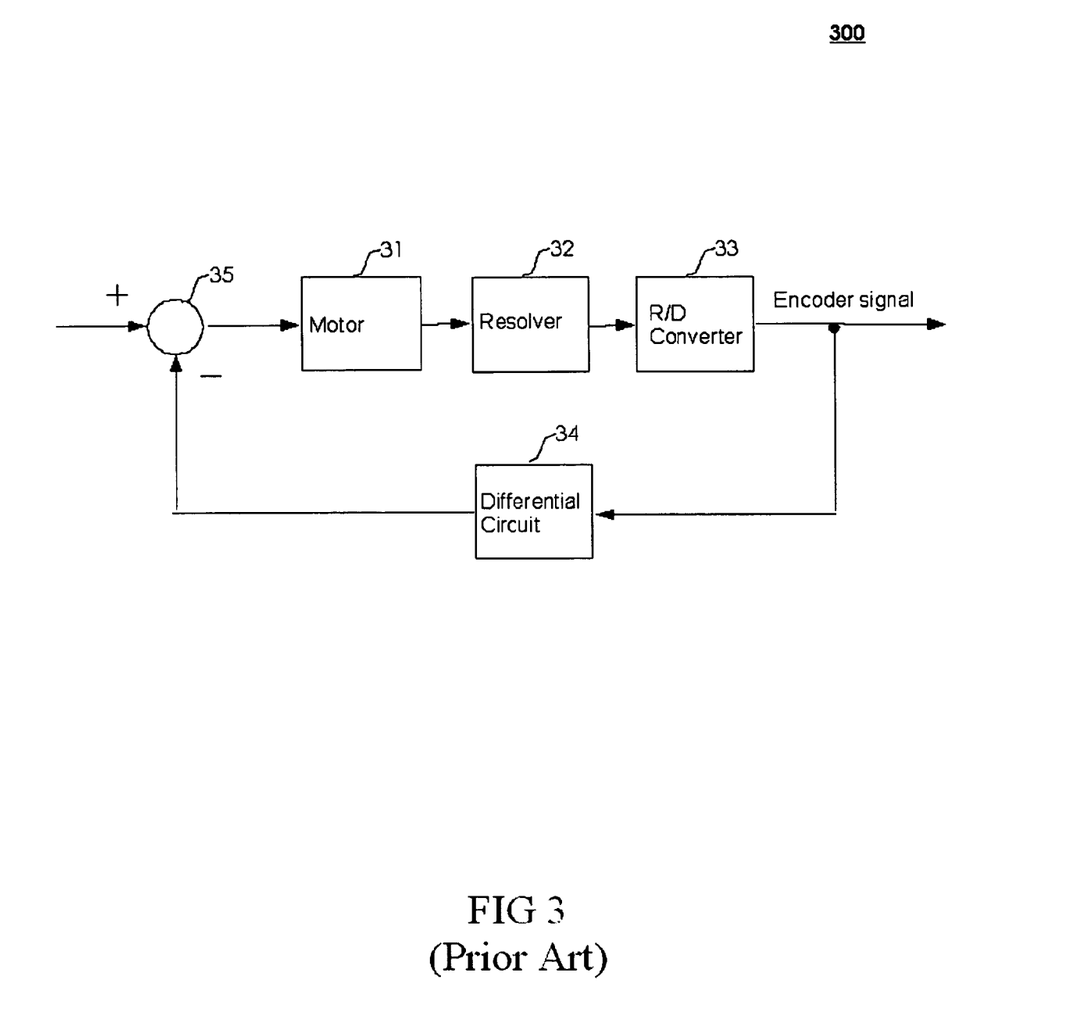
FIG. 3 is a block diagram illustrating structure associated with a conventional prior art servo control system.

It will be appreciated that such rotor axis angle determination maybe useful for controlling rotational quantities such as rotational speed of rotating devices such as motors, generators, and other rotating machines. A block diagram showing an exemplary structure for a speed controlling system, such as a speed servo system or the like is shown in FIG. 3. Therein, a rotational device such as a motor may be characterized, for example, with regard to rotor speed by determining and tracking the rotor axis angle using the aforementioned R/D converter. In speed controlling system 300, R/D converter 33 converts a sine wave output and cosine wave output as, for example, analog signals from resolver 32 into digital signals, and outputs an encoding signal showing the rotor axis rotation angle of resolver 32 using, for example, methods known to those of ordinary skill in the art. Speed control system 300 thus carries out position control and rotational speed control of motor 31 in accordance with the encoding signal from R/D converter 33.

Conventional speed control systems such as speed control system 300 generate a speed signal representative of the speed of the rotor by calculating a difference signal or otherwise differentiating an encoding signal output of R/D converter 33 in differential circuit 34 where differences are preferably calculated for a given time constant. Problems arise however in that a typical speed signal generated in a conventional speed control system, such as speed control system 300, is known to be strongly correlated with angle error associated with the rotor axis angle of resolver 32 which in turn corresponds to the rotor axis angle or position of a rotor shaft associated with motor 31 or other device being measured and controlled. In conventional speed control system 300, angle error is manifested in resolver 32, for example, as one or more higher-order harmonic frequency components having a frequency characterized as an integral multiple of the rotational frequency or as a function of the angle of the resolver rotor axis.

Accordingly, an exemplary spectrum distribution associated with angle error components is concentrated in a relatively low frequency band such as near the rotational frequency and integral multiples thereof. In the case of R/D converter 33, which may be configured to generate an encoded output, angle error is manifested by adding noise components to the encoded output having a white noise-like spectrum distribution. Thus, unless a cutoff frequency of an exemplary integrator or low pass filter associated with the output of resolver 32 is lowered compared to a cutoff frequency of an exemplary integrator or low pass filter associated with the encoder, e.g. the output of R/D converter 33, torque or speed ripple cannot be easily reduced.

Further problems arise, however, in connection with lowering the cutoff frequency as described above. For example, when the cutoff frequency of an integrator or low pass filter associated with the output of resolver 32 is lowered compared to an encoder output such as the output of R/D converter 33, the open loop gain coefficient is lowered, thereby slowing the overall response time of speed control system 300 as would be appreciated by one of ordinary skill in the art. Thus, to obtain high precision positioning, a speed signal with low ripple must be generated without sacrificing the overall response time of the control system.

In accordance with some conventional solutions, a speed detector can be provided in addition to the rotor position detector. Further, the bit resolution of R/D converter 33 can be increased. Such solutions however, result in increasing the size and complexity of circuit and/or system structures, reducing circuit and/or system reliability, and increasing circuit and/or system cost.

SUMMARY OF THE INVENTION

Accordingly, taking into account the above-mentioned problems and disadvantages, an object of the present invention is to provide an encoder output divider that has a simplified structure and that does not increase overall circuit/system costs.

Another object of the present invention is to provide an encoder output divider that, in operation with an R/D converter, reduces ripple or other noise signal components generated within the range of the designated rotational speed in a rotational speed control signal.

Thus, an exemplary encoder output divider in accordance with the present invention includes a measurement device such as, for example, a cycle measurement device that measures cycles associated with an exemplary encoded signal output from an exemplary R/D converter. The exemplary R/D converter preferably converts a sine wave output and a cosine wave output of a resolver that, as would be appreciated by one of ordinary skill in the art, generates an output corresponding to a position or angle of a rotor axis. The rotor axis of the resolver rotates in connection with a rotor of a device such as a rotor associated with a motor, generator, or other rotating mechanical, electrical, or electro/mechanical machinery. The exemplary R/D converter outputs the encoded signal associated with the digitized sine wave signal and cosine wave signal. A signal generator, which may include a Digital Signal Processor (DSP) or the like, is preferably configured to generate a 1/n cycle dividing encoded signal having a cycle of 1/n, where "n" is an integer having a value of two or greater. Thus the signal will have a cycle equal to "n" times that of the encoded signal based on the measured cycle as measured by the cycle measurement device.

Thus, in accordance with the present invention, the exemplary encoder output divider operates, at least in part, as follows. The cycle measurement device measures the cycle of the encoding signal output from the R/D converter, and the signal generator, such as the DSP, generates a 1/n cycle dividing encoded signal having a period related to the period of the encoded signal by a multiplication factor of 1/n, where n=2 or greater integer.

In accordance with various exemplary embodiments and modes, the present invention includes a calculator, such as a DSP, to calculate the rotational speed of the resolver based on the measured cycle of the encoding signal measured by the measurement device. When the calculated rotational speed of the resolver is within the range of a designated rotational speed, a 1/n cycle dividing encoded signal, as described above, is output from the signal generator. When the calculated rotational speed is outside the range of the designated rotational speed, the signal generator outputs the encoded signal from the R/D converter.

It should be noted that the range of the designated rotational speed is preferably between 400 rpm and 1200 rpm. The out-of-range values for the rotational speed may be described as being less than 400 rpm or greater than 1200 rpm. In accordance with still other alternative exemplary embodiments, the designated range may be established starting from a low range rpm value where ripple begins and extending through an rpm range to a high range rpm value where ripple subsides, or two ranges may alternatively be designated as no ripple ranges, e.g. up to a low range rpm and greater than a high range rpm.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
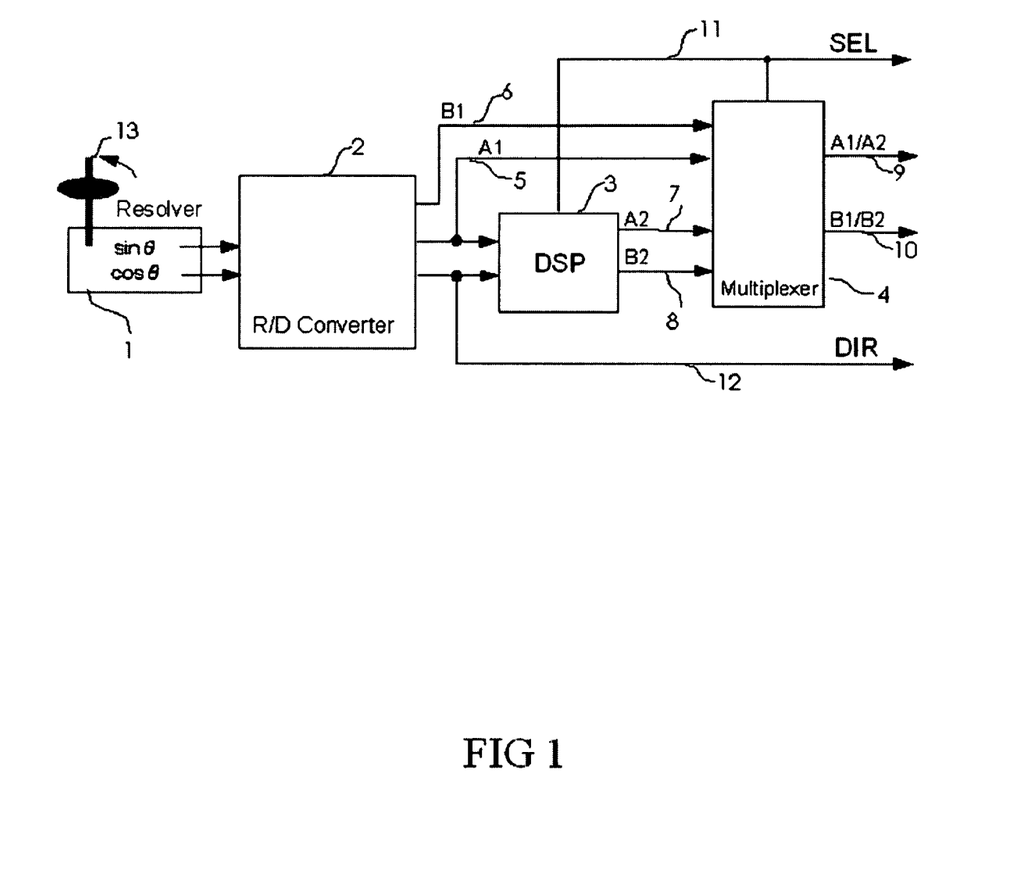
FIG. 1 is a block diagram illustrating structure associated with an exemplary servo control system having an encoder output divider according to one embodiment of the present invention.

As illustrated in FIG. 1 of the drawings, resolver 1 is for detecting the position of a rotating shaft (not shown) associated with a motor, or other rotating machinery as described above, based on a corresponding position of rotor 13 which is preferably coupled to the rotating shaft (not shown). R/D converter 2, as would be appreciated by one of ordinary skill in the art, preferably includes peripheral components such as a memory, a converter, an internal processor or DSP (all not shown), and may be configured to output encoded signals A1 5 and B1 6, as well as rotation direction signal DIR 12, based on the sine wave output and cosine wave output of resolver 1. Encoded signals A1 5 and B1 6 can be obtained from 12-bit angle data stored, for example, in a memory (not shown) associated with R/D converter 2. Encoded signals A1 5 and B1 6 are preferably generated at 1024 pulses per revolution of, for example, rotor 13.

Encoded signals are routed to DSP 3, which measures the rotational speed of resolver 1 and determines the cycle or period of encoded signals A1 5 and B1 6 using 50 pulses of encoded signal A1 5 as, for example, one unit or measurement interval. DSP 3 further measures one cycle or period of encoded signal A1 5 corresponding, for example, to the rotational speed of resolver 1, with timer 41 shown in FIG. 4. Timer 41 is configured to rapidly synchronize with encoded signal A1 5, for example, during a first pulse period thereof. During a second pulse period, DSP 3 further calculates a 1/16th dividing value of one pulse. Further, by determining the prospective timing of the starting and ending of 14-bit encoded signals A2 7 and B2 8 representing for example, a ¼ cycle division, the 14 bit encoded signals A2 7 and B2 8 are generated. Thus, DSP 3 analyzes 12-bit encoded signals A1 5 and B1 6 during the second pulse period of encoded signal A1 5 as described above, and generates 14-bit encoded signals A2 7 and B2 8, for example, from the 3rd to 50th pulse periods.

Encoded signals A1 5 and B1 6, along with encoded signals A2 7 and B2 8, may be input to multiplexer 4. Accordingly, DSP 3 is further configured to allow for encoded signals A1 5 and B1 6 of the R/D converter 2 to be selected when the rotor rotational speed of resolver 1, which is measured as described above by a measuring device such as DSP 3, is less than 400 rpm or greater than 1200 rpm or greater, and to allow encoded signals A2 7 and B2 8 to be selected when the rotor rotational speed of resolver 1 falls within the designated range of, for example, between 400 rpm and 1200 rpm. Selection is accomplished with a selection signal SEL 11 that may be generated by DSP 3 for selecting which of the signals may be output at multiplexer 4 at outputs A1/A2 9 and B1/B2 10.

It should be noted that during each of the 1st through the 50th pulse periods, DSP 3 is further configured to receive an indication of forward rotation and reverse rotation of the rotor axis of resolver 1 using the rotation direction signal DIR 12 from R/D converter 2. As noted above, multiplexer 4 outputs either 12-bit encoded signals A1 5 and B1 6 from R/D converter 2, or 14-bit encoded signals A2 7 and B2 8 from DSP 3, based on selection signal SEL 11. Thus, when the rotational speed of rotor 13 of resolver 1 is outside the designated range, for example, either up to 400 rpm or greater than 1200 rpm, encoded signals A1 5 and B1 6 of R/D converter 2 are output from multiplexer 4. When the rotational speed of rotor 13 of resolver 1 is within the designated range of between, for example, 400 rpm and 1200 rpm, encoded signal A2 7 and B2 8 output from DSP 11 may be selected and output from multiplexer 4. Thus, encoded signals of R/D converter 2 are enlarged by 2 bits, thereby effecting a multiplication factor of 4 times the encoder frequency, when rotational speeds fall within a designated range where the ripple and related error increases and becomes a problem.

The operation of an exemplary servo control system in accordance with one embodiment of the present invention, can be better understood from the following description. First, R/D converter 2 receives the sine wave output and cosine wave output of resolver 1. The sine wave output and cosine wave output, which are representative of the rotor angle of resolver 1, are input to R/D converter 2 and digitally converted. R/D converter 2, which may further generate 12-bit encoded signals A1 5 and B1 6 and based on, for example, a relative sign determination of the sine and cosine signals or a like method, generates and outputs rotation direction signal DIR 12. R/D converter 2 supplies encoded signals A1 5 and B1 6 to multiplexer 4 and supplies encoded signal A1 5 and rotation direction signal DIR 12 to DSP 11 in order to perform timing and cycle determination as described above.

Figure 2:
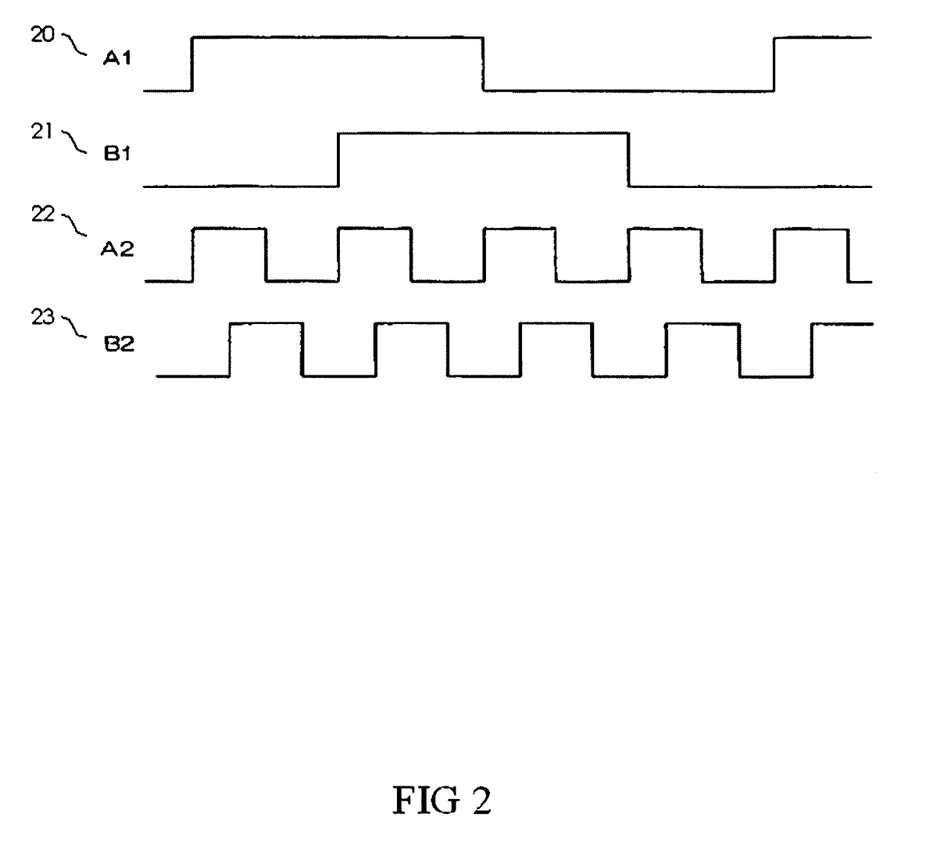
FIG. 2 is a diagram illustrating timing associated with exemplary encoded signals A1, B1, A2, and B2 output as shown in FIG. 1.
Figure 4:
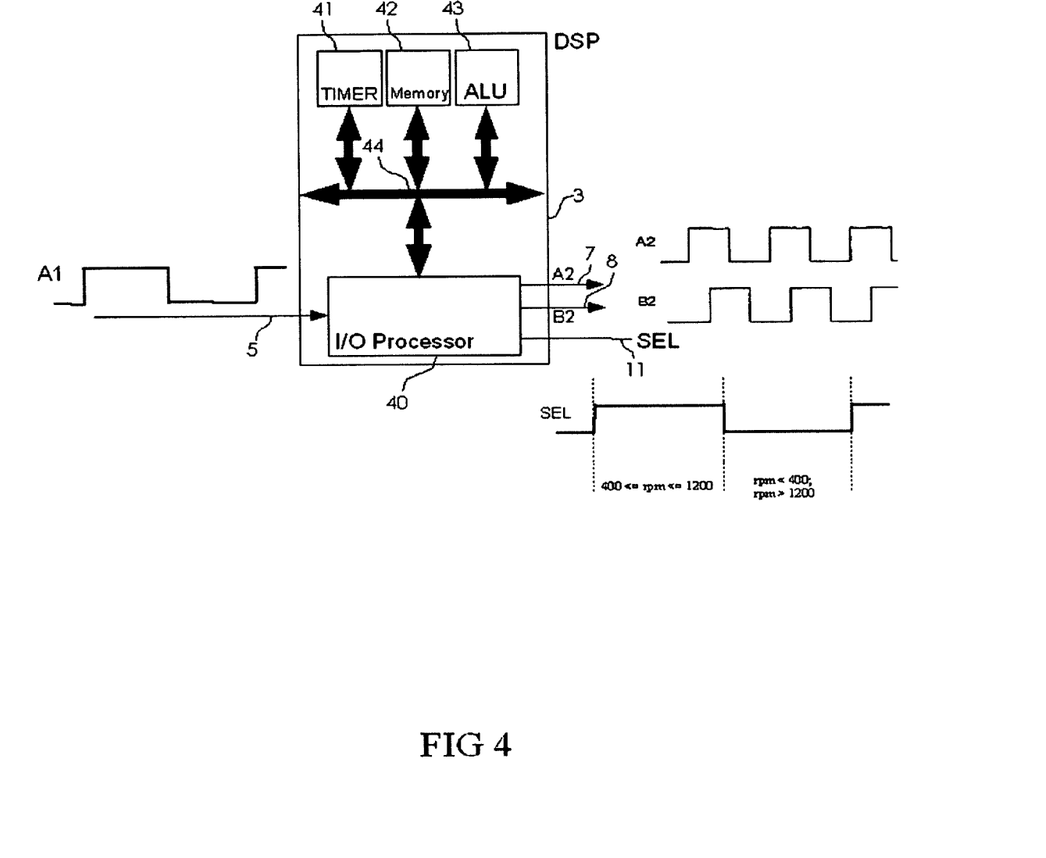
FIG. 4 is a diagram illustrating details associated with the operation of an exemplary R/D converter in accordance with one embodiment of the present invention.

As shown in FIG. 2, the respective timings of encoder output signals A1 5, B1 6, A2 7 and B2 8 are graphically depicted as signals 20–23. The periods of encoder output signals A1 5 and B1 6 are related to the periods of encoder output signals A2 7 and B2 8 by integral multiples, or as shown in FIG. 2, by an integer factor of 2. DSP 3, as shown in FIG. 4, includes an I/O processor 40 for receiving signals including encoded signal A1 5 and for outputting signals including selection signal SEL 11, and encoded signals A2 7 and B2 8. DSP 3 further includes timer 41, a memory 42, an arithmetic logic unit (ALU) 43 or the like for performing calculations and other operations as would be understood by one of ordinary skill in the art, and an interconnection bus 44. DSP 3 is configured to measure one cycle of the encoded signal A1 5 to, inter alia, determine the rotational speed of the resolver.

As described above, DSP 3 can be configured to determine the rotational speed by synchronizing timer 41 with encoded signal A1 5 during the first pulse period, and DSP 3 can further be configured to calculate, using, for example, ALU 43, the 16th dividing value of one pulse during the second pulse period. By determining the timing of the starting and ending period of encoded signal A1 5 in such a manner, 14-bit encoded signals A2 7 and B2 8, which it should be noted have a dividing cycle (in this example, a divide by 2 cycle) as compared to encoded signal A1 5, may be generated and output using, for example, I/O processor 40. It should further be noted that 14-bit encoded signals A2 7 and B2 8 are generated during the 3rd to 50th pulse periods of encoded signal A1 5, and may be output as described and supplied to the multiplexer 4.

Also as described, selection signal SEL 11 enables encoded signals A1 5 and B1 6 to be output from multiplexer or, more generally, selector, output selector, or other similar device or circuit, 4 on output line A1/A2 9 and output line B1/B2 10 when the rotor rotational speed of the resolver is measured, as described above, as being either less than 400 rpm or greater than 1200 rpm. When the rotor rotational speed is between 400 rpm and 1200 rpm, selection signal SEL 11 allows encoded signals A2 7 and B2 8 from DSP 3 to be selected and output from multiplexer 4 on output line A1/A2 9 and output line B1/B2 10.

Thus multiplexer 4 outputs encoded signals A1 5 and B1 6 based on selection signal SEL 11 when the rotational speed of the rotor is, for example, either less than 400 rpm or greater than 1200 rpm, and encoded signal A2 7 and B2 8 when the rotational speed of the rotor is between 400 rpm and 1200 rpm. As a result, when a rotational value is in the designated range of rotation where angle error is great and precision deteriorates due to error or speed ripple, the designated range being between 400 rpm and 1200 rpm, encoded signals A2 7 and B2 8, which correspond to encoded signals A1 5 and B1 6 of R/D converter 2 when enlarged by 2 bits to result in a 4 fold frequency increase, are output.

Figure 5:
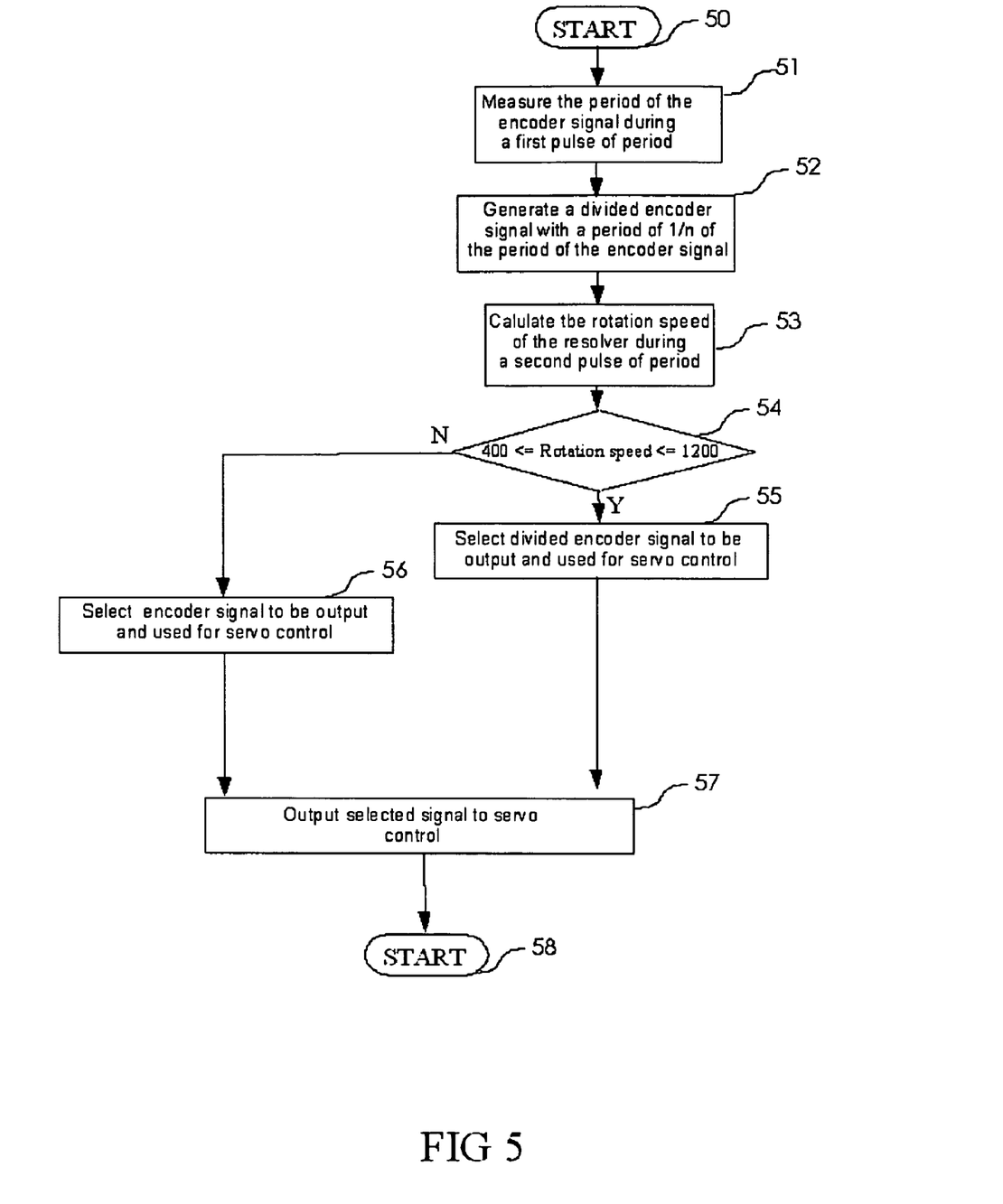
FIG. 5 is a flow chart illustrating an exemplary method of operation according to one embodiment of the present invention.

As described hereinabove, operation in accordance with the present invention is illustrated in FIG. 5, starting at 50. At 51, DSP 3 can determine the period of encode signal A1 5 from the first measured pulse, such as from a first signal portion or half cycle thereof. Once the period of the encoded signal is determined, DSP 3, for example, may further generate a divided encoder output signal at 52 by dividing the encoder period by an integer value of "n" to, for example, double the frequency or number of cycles within a time period when n=2. During the second measured pulse, such as during a second signal portion or half cycle thereof, at 53, DSP 3 may determine and test the speed of rotation at 54. If the speed is within the designated range, such as between 400 rpm and 1200 rpm, the divided encoded signal may be output using for example, a multiplexer or a like dividing circuit, to a servo control system at 55. If the rotational speed is not within the designated range, the undivided encoded signal may be output using, for example, the multiplexer or the like, to the servo control system at 56. Although the process is shown to end at 57, it will be appreciated by one of ordinary skill in the art that the procedures described herein above may be repeated continuously to provide continuous control in the servo control system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. An encoder output divider configured to divide an encoded signal, comprising:
    a timer configured to measure a first period of the encoded signal;
    a divider coupled to the timer and configured to generate a first divided encoded signal having a second period, the second period related to the first period by a multiplication factor of 1/n, where n includes an integer having a value of 2 or more;
    a calculator coupled to the divider and the timer and configured to calculate a value based on the measured first period; and
    an output selector coupled to the calculator, the divider and the timer and configured such that when the calculated value is within a designated range, the first divided encoded signal is selected for output, and when the calculated value is outside the designated range, the encoded signal is selected for output.

2. An encoder output divider according to claim 1, wherein:
    the value includes a rotational speed associated with a resolver; and
    the output selector is configured such that when the calculated rotational speed is within a designated range of rotational speeds, the divided encoded signal is selected for output, and when the calculated rotational speed is outside the designated range of rotational speeds, the encoded signal is selected for output.

3. An encoder output divider according to claim 2, wherein the designated range of rotational speeds includes speeds from 400 rpm to 1200 rpm.

4. An encoder output divider according to claim 1, wherein:
    the divider is further configured to generate a second divided encoded signal having the second period and offset in time from the first divided encoded signal by a quarter of the second period; and
    the output selector is further configured such that when the calculated value is within the designated range, the first divided encoded signal and the second divided encoded signal are selected for output, and when the calculated value is outside the designated range, the first encoded signal and the second encoded signal are selected for output.

5. A resolver/digital (R/D) converter configured to find an angle of a rotor axis of a resolver based on a sine wave output and a cosine wave output of the resolver, the R/D converter comprising:
    a converter configured to convert the sine wave output and cosine wave output of the resolver into an encoded signal;
    a timer coupled to the converter and configured to measure a first period of the encoded signal;
    a signal generator coupled to the converter and the timer and configured to generate a divided encoded signal having a second period, the second period related to the first period by a multiplication factor of 1/n, where n includes an integer having a value of 2 or more;
    a calculator coupled to the signal generator, the converter, and the timer, the calculator configured to calculate the rotational speed of the resolver based on the measured first period of the encoded signal; and
    an output selector coupled to the calculator, the signal generator, the converter, and the timer, the output selector configured to select the divided encoded signal for output when the calculated rotational speed of the resolver is within a designated range, and to select the encoded signal for output when the calculated rotational speed is outside the designated range.

6. An R/D converter according to claim 5, wherein the designated range of rotational speeds includes rotational speeds from 400 rpm to 1200 rpm.

7. A resolver/digital (R/D) converter according to claim 5, wherein:
    the encoded signal includes a first encoded signal and a second encoded signal each having the first period;
    the divided encoded signal includes a first divided encoded signal and a second divided encoded signal each having the second period;
    the signal generator is further configured to generate the second divided encoded signal offset in time from the first divided encoded signal by a quarter of the second period; and
    the output selector is further configured to select the first divided encoded signal and the second divided encoded signal for output when the calculated rotational speed of the resolver is within a designated range, and to select the first encoded signal and the second encoded signal for output when the calculated rotational speed is outside the designated range.

8. An encoder comprising:
    a converter configured to convert a sine wave signal and a cosine wave signal from a resolver into an encoded signal having a first period; and
    a digital signal processor (DSP) coupled to the converter, the DSP configured to:
        measure the first period of the encoded signal,
        generate a divided encoded signal having a second period related to the measured first period by a value of 1/n where n is an integer of 2 or greater,
        determine a rotational speed associated with the resolver based on the measured first period, and
        provide a selection signal such that when the rotational speed is within a designated range, the selection signal indicates that the divided encoded signal should be output, and when the rotational speed is outside the designated range, the encoded signal should be output, wherein
    the divided encoded signal includes a first divided encoded signal and a second divided encoded signal, and
    the DSP is further configured to generate the second divided encoded signal offset from the first divided encoded signal by a quarter of the second period and having a period equal to the second period, the encoder further comprising:

a multiplexer coupled to the DSP and the converter, the multiplexer configured to receive the selection signal and output the first divided encoded and the second divided encoded signal when the rotational speed is within the designated range and output the first and the second encoded signals when the rotational speed is outside the designated range.

9. An encoder output divider configured to divide an encoded signal, comprising:

a timer configured to measure a first period of the encoded signal; and a divider coupled to the timer and configured to generate a first divided encoded signal having a second period, the second period related to the first period by a multiplication factor of 1/n, where n includes an integer having a value of 2 or more;

wherein the divider is further configured to generate a second divided encoded signal having the second period, the second divided encoded signal being offset in time from the first divided encoded signal by a quarter of the second period.

* * * * *

UNITED STATES PATENT AND TRADEMARK OFFICE
CERTIFICATE OF CORRECTION

| | | |
|---|---|---|
| PATENT NO. | : 7,119,717 B2 | Page 1 of 1 |
| APPLICATION NO. | : 10/812311 | |
| DATED | : October 10, 2006 | |
| INVENTOR(S) | : Takao Takehara | |

It is certified that error appears in the above-identified patent and that said Letters Patent is hereby corrected as shown below:

Delete Lines 38-47, Claim 2, Col. 7, and insert Claim 2, as follows

--2. An encoder output divider according to claim 1, wherein:
the calculated value includes a rotational speed associated with a resolver; and
the output selector is configured such that when the calculated rotational speed is within a designated range of rotational speeds, the first divided encoded signal is selected for output, and when the calculated rotational speed is outside the designated range of rotational speeds, the encoded signal is selected for output.--

Signed and Sealed this

Third Day of July, 2007

JON W. DUDAS
*Director of the United States Patent and Trademark Office*